Sept. 25, 1945.  F. D. BRADDON  2,385,342
GYROSCOPIC INSTRUMENT
Filed March 1, 1943  2 Sheets-Sheet 1
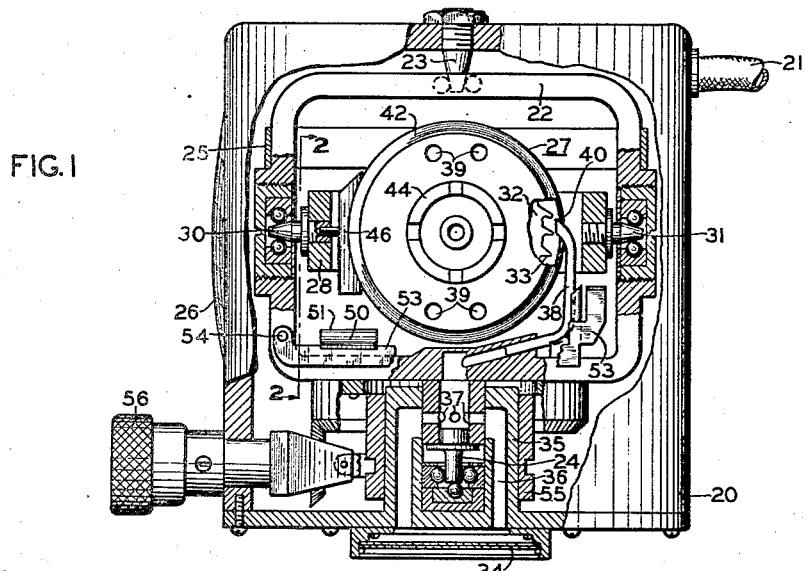
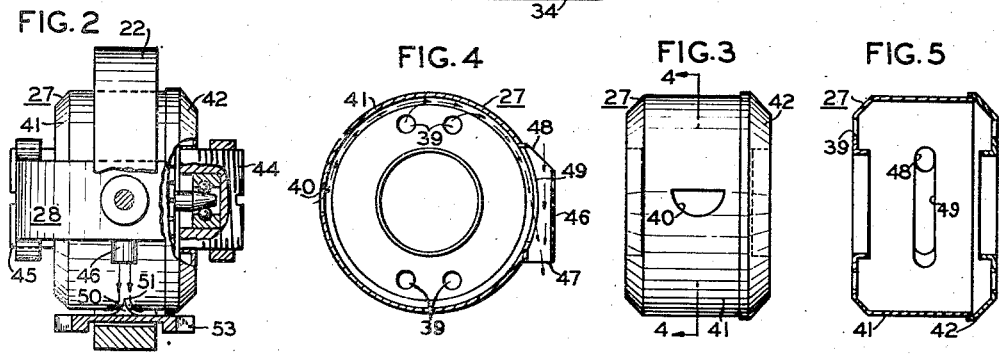
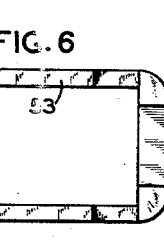
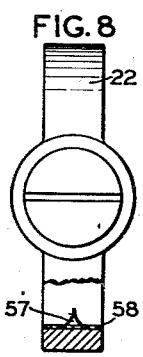
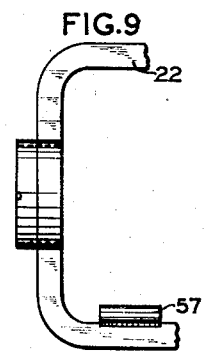
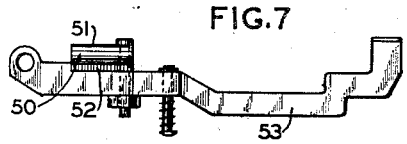
INVENTOR
F. D. BRADDON
BY Herbert H. Thompson
his ATTORNEY.

Sept. 25, 1945.  F. D. BRADDON  2,385,342
GYROSCOPIC INSTRUMENT
Filed March 1, 1943  2 Sheets-Sheet 2

INVENTOR
F. D. BRADDON
BY
ATTORNEY

Patented Sept. 25, 1945

2,385,342

UNITED STATES PATENT OFFICE 2,385,342

GYROSCOPIC INSTRUMENT

Frederick D. Braddon, Babylon, N. Y., assignor to Sperry Gyroscope Company, Inc., Brooklyn, N. Y., a corporation of New York Application March 1, 1943, Serial No. 477,665

8 Claims. (Cl. 74—5)

This invention relates to gyroscopes, more particularly of the directional, air-spun type. It is usual to spin such gyroscopes in the open air from an air jet and it has been found that the air after being used to spin the gyroscope, circulating at random in the large outer housing, causes disturbances of the gyroscope. According to the present invention, I prefer to enclose the rotor in a close-fitting casing to confine the used air largely within the casing and to discharge it in such manner that it does not disturb the gyroscope, but, on the other hand, may be used to maintain the gyro erect.

One of the features of the invention resides in the improved pneumatic torque exerting means provided to level the rotor case of the gyro instrument.

Another feature of the invention is contained in the provision of a novel rotor case mounting construction which enables a gyro rotor of the bucket type to be driven directly by the air issuing from a nozzle mounted in the ring of the gyro instrument.

Still a further feature of the invention resides in the provision of a rotor bearing case in the form of a close fitting cylindrical shell that encloses the rotor and includes an air exhausting tube incorporated therein.

Other features and structural details of the invention will be apparent from the following description when read in relation to the accompanying drawings, wherein, Fig. 1 is an elevation view, partly in section, of a gyro instrument constructed in accordance with the invention.

Fig. 2 is a section view taken on line 2—2, Fig. 1.

Fig. 3 is a detail side elevation of the rotor bearing case of the gyro instrument.

Fig. 4 is a section view taken on line 4—4, Fig. 3.

Fig. 5 is a vertical section of the rotor case illustrated in Fig. 3.

Fig. 6 is a detail plan view showing the yoke of the caging mechanism employed in the improved instrument.

Fig. 7 is a side elevation of the part illustrated in Fig. 6.

Fig. 8 is a detail elevation view of a modified form of vertical ring adapted for use in connection with the present invention.

Fig. 9 is a further view of the ring taken at right angles to showing thereof in Fig. 8.

Figure 10:
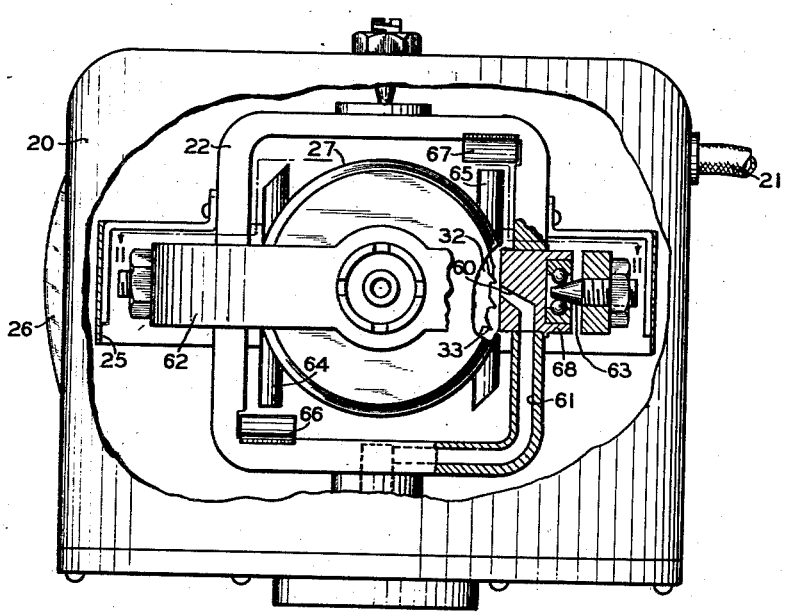
Fig. 10 is a view similar to Fig. 1 showing a modified form of the invention.

With reference to Fig. 1, the improved gyro instrument illustrated therein is shown to include an air tight outer casing 20 from which air is continuously exhausted by way of outlet connection 21. Suitable pump means (not shown) of any conventional construction may be employed to perform this function. In the directional type of gyro instrument shown in the drawings, a vertical ring 22 is mounted within the outer casing 20. Ring 22 pivots about a vertical axis defined by the trunnions 23 and 24 and the cooperating bearings therewith. A side reading compass card 25 is mounted on the ring 22, the same being observable through a window 26 in the front wall of the casing 20. Card 25 is read in connection with a conventional lubber line (not shown) to obtain directional indications from the gyro instrument.

The rotor bearing case of the instrument, indicated generally at 27 in Fig. 1, is supported or mounted on the ring 22 by means of a gimbal ring or yoke 28 that is fixed to the case 27. The case and ring or yoke 28 are mounted for pivotal movement about a horizontal axis on the vertical ring by means of trunnions 30 and 31 and the cooperating bearings therewith. The gyro rotor 32, in the present instance, is air driven and includes buckets 33 on the periphery thereof. Rotor 32 is mounted to spin within the case 27 on an axis in Fig. 1 that is normal to the plane of the paper. The axes of the ring 22, case 27 and rotor 32 are consequently mutually perpendicular when the case is in a tilt-free or level position in which the case axis and rotor case are in a plane at right-angles to the axis of the vertical ring.

Air enters the continuously evacuated casing 20, in this instance, by way of a filter 34 situated in the base of the casing 20. The base of the casing 20 includes an upwardly extending hub 35 in which the bearings that receive the trunnion 24 are located. Air moves from the rear of the filter 34 through passageways 36 in the hub 35 and into a central opening in an enlarged portion of the lower trunnion of vertical ring 22 by way of the ports 37. An upward extending bent pipe 38 fixed to the ring 22 receives the air from the central opening in the hollow trunnion. The upper end of the fixed pipe 38 is curved and, in the present instance, projects within an opening 40 in the rotor case 27 to a position adjacent the buckets of the gyro rotor 32. The point of impact of the rotor driving air jet on the rotor is situated on the axis of the case. This end of the pipe forms a nozzle that directs the air against the buckets of the gyro rotor to spin the rotor.

With particular reference to Figs. 2 to 5, the gyro rotor case 27 illustrated is constructed in the form of a close fitting cylindrical shell which encloses the rotor 32. The shell includes a body portion 41 and a cover portion 42 which fit together to provide the case 27. In this form of the invention, the vertical ring 22 encircles the horizontal ring or yoke 28. The gyro rotor shaft 43, Fig. 3, journals in adjustable bearing members 44 and 45 that are screw-threaded in tapped openings in the opposite sides of the horizontal ring 28. The case forming parts 41 and 42 are fixed in position with respect to the horizontal ring or yoke by means of the members 44 and 45 as particularly shown in Fig. 2.

In accordance with the teaching of the present invention, air is withdrawn from the interior of the case 27 by means of a discharge channel or nozzle forming tube 46 that is incorporated in the shell body 41. Tube or channel 46 extends radially upwardly and downwardly with respect to the axis 30—31 of the case or horizontal ring 28 and is arranged in tangential relation to the periphery of the shell. The tube 46 may be provided with three openings or ports that are respectively designated at 47, 48, and 49. The arrows in Fig. 4, clearly show the direction that the air moves in passing through and out of the close fitting case 27. Movement of the air in the case from opening 40 follows the interior circumferential wall of the shell 41 until the same reaches the opening 49 by which the tube communicates with the interior of the case. Opening 49 is in the side wall of the tube. The air moves tangentially off the face of the rotor and out through the port or opening 49 in wall of the case and, in this instance, is directed downwardly to discharge through the port or nozzle 47 at the lower end of the tube. Due to the high velocity of the air, as described, additional air is drawn into the tube or nozzle 46 through opening 48 for discharge out of opening 47, thereby greatly increasing the volume of air discharged through said opening. In order to further supplement the air discharged from the nozzle forming tube 46, openings 39 may be provided in the wall of the rotor case 27 through which additional air is drawn by the action of the revolving rotor and the air swirling around the interior of the casing with the rotor. No reduction is made in the cross-sectional area of the discharge opening 47 in the tube 46, thus avoiding a relatively large pressure differential between the air within and outside of the rotor case. The discharge channel consequently is provided with one discharge outlet and two intake openings through one of which air is received from the interior of the shell or case 27.

In accordance with the teaching of the present invention, the air used to spin the rotor may be further utilized to provide the torque effort of a pneumatic couple functioning upon tilt of the case about its horizontal axis to restore the same to a level position. It will be understood, however, that the air discharged from the nozzle 47 in the case may also be obtained by employing a conventional electrically spun rotor, since the spinning of the rotor within the close fitting casing 27 sets up a revolving current of air which is drawn in through the ports 39 and exhausted through the port 47, the rotor acting as a centrifugal air pump within the case. One of the parts of the pneumatic torque exerting couple is provided by the nozzle 46, which moves with movement of the case about its horizontal axis. The other part of the couple is formed by a plow or deflecting baffle that is fixed to move with the vertical ring 22. The plow means as indicated at 50 has a knife edge 51 that normally bisects the jet of air issuing from the nozzle 46 as clearly shown in Fig. 2. The divided jet is redirected by the plow so that the respective parts thereof exert a balanced torque about the axis of the vertical ring 22. When tilt of the case occurs, the plow intercepts unequal parts of the jet issuing from the nozzle which causes a resultant torque that is effective to restore the case to a normal level position. The knife edge 51 of the plow is situated in a vertical plane passing through the axis of the rotor bearing case 27. The plow 50 is sufficiently close to the nozzle to receive the air discharged from the nozzle prior to the evacuation of the same out of the casing 20 by way of the connection 21. The plow 50 provided is normally situated at the center of the air jet issuing from the nozzle and functions to differentially intercept and redirect the air flow to obtain the desired result.

If sufficient tilt of the case occurs that the air jet from the nozzle is clear of the plow 50, the nozzle then functions independently of the plow to exert a levelling torque about the axis of the ring. The horizontal component of the direct reaction of the air jet, which is present to some extent for small tilts, is then effective to erect the gyroscope without the aid of the plow or baffle.

As shown in the form of the invention illustrated in Figs. 6 and 7, the plow 50 is mounted on a plate 52 fixed to a caging yoke 53 of conventional construction which is pivotally mounted at 54 on the vertical ring. Caging yoke 53 is a part of the well known caging mechanism of the instrument which further includes the vertically movable, slotted collar 55 and the actuating knob 56. In Figs. 8 and 9, the plow means is indicated at 57. As shown in this form of the invention, the plow 57 is situated on a plate 58 which is directly mounted on the vertical ring 22.

Figure 11:
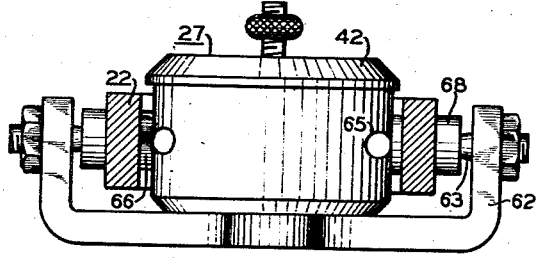
Fig. 11 is a section view taken on line 11—11, in Fig. 10.

With reference to Figs. 10 and 11, a modified form of gyro instrument is shown in which the air driven gyro rotor 32 is spun by a jet of air issuing from a nozzle 60 contained in bearing housing 68. Nozzle 60 receives air from a passageway 61 in the vertical ring 22 which leads to the previously described filter. Ring 28 in the present instance, is replaced by a yoke 62 that partially encircles the vertical ring 22 and is mounted thereon by suitable trunnion-bearing connections, one of which is indicated at 63. In this form of the invention, the diameter of the cylindrical rotor case 27 is made only slightly smaller than the spacing between the vertically extending oppositely disposed arms of the vertical ring 22. The close fitting case 27, as shown, may include a pair of nozzles 64 and 65, similar to nozzle 46, which direct air upon the respective plows 66 and 67 on the vertical ring 22. Nozzles 64 and 65 are arranged in parallel relation, each of the same being mounted on the case in a position to direct air radially of the axis of the case at a constant spacing from the axis of the ring.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pneumatically controlled gyro instrument having a substantially closed circumferential rotor case, a discharge channel tangential to and on said case with an air intake port in the side wall thereof communicating with the interior of the case, an air discharge port at one end thereof, an intake port at the other end thereof receiving air from the exterior of the case, and a deflecting baffle in the path of the augmented discharge air whereby the gyroscope is erected.

2. In a pneumatically controlled gyro instrument with an air spun rotor, a rotor bearing case in the form of a close fitting cylindrical shell, that encloses the rotor, having a discharge channel included therein arranged in tangential relation to the periphery of the shell, said channel having a port at one end thereof through which the air employed to spin the rotor is exhausted, a port in the side wall thereof communicating with the interior of the shell, and a port at the other end thereof through which additional air is drawn from the exterior of the shell.

3. A pneumatically controlled gyro instrument with a rotor bearing case in the form of a cylindrical shell having a nozzle providing tube incorporated therein arranged in tangential relation to the periphery of the shell, said tube having an air discharging opening at one end thereof, an intermediate air receiving opening communicating with the interior of the shell, an opening at the other end thereof receiving air exteriorly of the case, and baffle means in the path of the discharged air for aiding the erection of the gyroscope.

4. A gyro instrument as claimed in claim 3, in which the end walls of the shell have openings that admit air to the interior thereof.

5. In a directional gyro, a vertical ring with an air passageway therein, a rotor bearing case having an opening therein, means for mounting said case for movement about a horizontal axis on said ring comprising a yoke fixed to the case and bearing connections therefor situated exteriorly of the ring, a bucket type rotor carried by said case, and a nozzle positioned at the end of the passageway in said ring adjacent said rotor, said nozzle directing air upon the rotor through the opening in the case.

6. In a directional gyro, a vertical ring with an air passageway therein, a rotor bearing case mounted for pivotal movement about a horizontal axis on said ring by means of a yoke fixed to the case and bearing connections therefor situated exteriorly of the ring, said case having an opening therein adjacent said ring, a bucket type rotor carried by said case, and a nozzle adjacent the opening in the case at the end of the passageway in the ring, said nozzle directing air upon the rotor through the opening in the case.

7. In a directional gyro having an air spun rotor, a case enclosing said rotor, a yoke having central boss and opposite arm portions to which the rotor case is fixed on the central boss, and a vertical ring on which said yoke is mounted at the opposite arm portions thereof for pivotal movement about a horizontal axis, the arms of said yoke extending at least partially around said ring so as to pivot said yoke on the outside of the ring.

8. In a gyro instrument, a substantially closed rotor case, a discharge channel on said case with an opening in the side wall thereof through which air is received from the interior of the case, said channel having openings at both ends thereof through one of which air from the interior of the case is discharged and through the other of which air is drawn from outside of the case to augment the air discharged through said channel, said discharge air acting to erect the gyroscope on tilt thereof.

FREDERICK D. BRADDON.